US009316343B2

(12) United States Patent
O'Hara

(10) Patent No.: US 9,316,343 B2
(45) Date of Patent: Apr. 19, 2016

(54) PORTABLE CONCRETE MOLDING MACHINE

(76) Inventor: Fergus O'Hara, Jindalee (AU)

( * ) Notice: Subject to any disclaimer, the term of this patent is extended or adjusted under 35 U.S.C. 154(b) by 0 days.

(21) Appl. No.: 12/901,469

(22) Filed: Oct. 8, 2010

(65) Prior Publication Data

US 2011/0117230 A1 May 19, 2011

(30) Foreign Application Priority Data

Nov. 13, 2009 (AU) .............................. 2009101165

(51) Int. Cl.
| | |
|---|---|
| *F16M 13/02* | (2006.01) |
| *B28B 17/00* | (2006.01) |
| *F16M 3/00* | (2006.01) |
| *E01C 19/48* | (2006.01) |
| *E04G 11/20* | (2006.01) |
| *E04G 11/34* | (2006.01) |
| *F16M 1/04* | (2006.01) |

(52) U.S. Cl.
CPC .............. *F16M 3/00* (2013.01); *E01C 19/4893* (2013.01); *E04G 11/20* (2013.01); *E04G 11/34* (2013.01); *F16M 1/04* (2013.01)

(58) Field of Classification Search
CPC ........ F16M 1/04; F16M 3/00; E01C 19/4893; E04G 11/34; E04G 11/20
USPC .................. 425/62, 64, 182, 190; 249/2, 139; 404/98; 248/637, 671, 672, 674, 678
See application file for complete search history.

(56) References Cited

U.S. PATENT DOCUMENTS

| | | | | |
|---|---|---|---|---|
| 2,151,240 | A * | 3/1939 | Soss ................................ 16/251 |
| 3,989,230 | A * | 11/1976 | Martens .......................... 366/32 |
| 4,310,293 | A * | 1/1982 | Eggleton .......................... 425/62 |
| 4,936,763 | A * | 6/1990 | Thomas ........................... 425/64 |
| 4,946,358 | A * | 8/1990 | Okuda et al. .................... 425/183 |
| 5,007,816 | A * | 4/1991 | Hehl ............................... 425/135 |
| 5,662,431 | A * | 9/1997 | Colvard .......................... 404/105 |
| 6,450,730 | B1 * | 9/2002 | Matthias et al. ................. 404/98 |
| 6,577,214 | B1 * | 6/2003 | DeGrazia et al. ............... 335/68 |
| 6,863,470 | B2 * | 3/2005 | Eggleton et al. ................ 404/98 |
| 7,021,599 | B2 * | 4/2006 | DeGrazia et al. ............. 248/645 |
| 7,024,822 | B2 * | 4/2006 | Scheer et al. ................... 49/397 |

(Continued)

FOREIGN PATENT DOCUMENTS

WO WO 2008068077 A1 * 6/2008 .............. F04B 53/00

*Primary Examiner* — Yogendra Gupta
*Assistant Examiner* — Emmanuel S Luk
(74) *Attorney, Agent, or Firm* — Fitzpatrick, Cella, Harper & Scinto

(57) ABSTRACT

An adjustable mounting assembly (80) for a machine, such as a portable concrete molding machine (10), has a plurality of base plates (81), each base plate (81) having a plurality of holes and/or slots (82) therethrough arranged in a pattern to enable a number of different motors/engines (50, 150) to be mounted thereon. Each base plate (81) has a hinge assembly (83) along one side, which releasably receives a hinge pin (84) releasably engagable in support member(s) on the machine (10) to allow quick interchange of different motors/engines (50, 150), each with a respective base plate (81). An adjusting stud (89) on the opposite side enables adjustable inclination of the base plate (81) relative to the machine (10), to so enable a flexible drive assembly (52), interconnecting the motor/engine (50, 150) fitted to the machine (10), and the input shaft (53) on the machine (10), to be selectively tensioned when a motor/engine (50, 150) is fitted to the machine (10) (or to be de-tensioned for a motor/engine (50, 150) interchange.)

15 Claims, 5 Drawing Sheets

(56) References Cited

U.S. PATENT DOCUMENTS

| | | | |
|---|---|---|---|
| 7,932,794 B2 * | 4/2011 | Suter | 335/68 |
| 8,128,390 B2 * | 3/2012 | O'Hara | 425/63 |
| 2003/0209645 A1 * | 11/2003 | DeGrazia et al. | 248/674 |
| 2004/0232308 A1 * | 11/2004 | DeGrazia et al. | 248/674 |

* cited by examiner

PORTABLE CONCRETE MOLDING MACHINE

This application claims priority from Australian Patent Application No. AU 2009-101165, filed on Nov. 13, 2009, the entire contents of which are incorporated by reference herein.

BACKGROUND OF THE INVENTION

1. Field of the Invention

THIS INVENTION relates to an improved portable concrete molding machine.

The invention also relates to a mounting assembly enabling two or more different motors to be interchanged in a machine, such as the portable concrete molding machine.

Throughout the specification, the term "motor" shall, throughout this specification, include both "motors" and "engines", of the types including electric motors, hydraulic motors, pneumatic motors, internal combustion engines (eg., operating on fuels such as gasoline, petrol, diesel, kerosene, bio-fuels or the like), and like power-plants.

2. Prior Art

The concrete molding machines disclosed in AU-B-16008/88 (620031) (Edgetec Group Pty Ltd) and AU-2007100358 (Edgetec Group Pty Ltd) are typically provided with electric motors or petrol engines in the 1-5 HP (0.75 KW-3.8 KW) range. For example, the internal combustion engines may be proprietary engines of the types sold under the "HONDA" and "BRIGGS & STRATTON" (registered trade marks).

Some operators prefer electric motors; while others prefer internal combustion engines.

However, there are situations where operators find that the motors they have selected are unsuitable for the intended operating conditions. For example, on sites where mains electricity is not available, operators must have access to electrical generators to provide the necessary power for their electric-motor-powered machines. Alternatively, internal-combustion-engine-powered machines may not be acceptable on "low-noise" sites where the work must be carried out at night/early morning close to residential areas.

To date, operators have either had to have two machines—one electrically-powered and one with an internal combustion engine; or only operate their single machines when the conditions are suitable.

The need for two machines increases the capital outlay of the operators; only one machine is being productive at any given time; and each machine is still subject to depreciation, even while not in use.

SUMMARY OF THE PRESENT INVENTION

It is an object of the present invention to provide a mounting assembly which enables two or more different motors to be interchanged on a machine, such as a portable concrete molding machine.

It is a preferred object of the present invention to provide a mounting assembly where the respective motors can simply and easily be interchanged, and/or simply removed for "bench-top" servicing (such as oil-and-filter changes, pulley replacement and general maintenance).

It is a further preferred object of the present invention to provide a mounting assembly which can be used with a wide range of different motors.

It is a still further preferred object of the present invention to provide a mounting assembly where the drive interconnecting the respective motors to the machine can be quickly and accurately re-set to its operating parameters.

It is a still further preferred object of the present invention to provide a machine, such as a portable concrete molding machine, incorporating the mounting assembly.

Other objects of the present invention will become apparent from the following description.

In one aspect, the present invention resides in a mounting assembly for a motor (as hereinbefore defined) for a machine, including:

a base member, having a plurality of holes and/or slots therethrough, adapted to enable releasable mounting of respective different motors thereon;

a hinge assembly along, or adjacent, one side of the base member;

at least one hinge pin for releasable engagement of the hinge assembly with at least one support member on the machine; and at least one adjustment member at, or adjacent, an opposite side of the base member and operable to selectively adjust the position of the base member relative to the machine.

Preferably, the base member has a substantially planar base plate which incorporates the holes and/or slots, where the base plate may be provided with reinforcing ribs, flanges or other formations on an underside thereof.

Preferably, the holes and/or slots in the base plate are arranged in a pattern so that only one pattern is required to mount all the different motors intended to be mounted in the machine.

Preferably, a respective base member, with its respective hinge assembly, is provided for each different motor to be fitted to the machine.

Preferably, there is at least a spaced pair of the support members on the machine, where the support members may include a pair of spaced plates which define respective ends of a motor compartment on the machine and which are preferably aligned parallel to opposed ends of the base member.

Alternatively, the at least one pair of spaced support members may comprise lugs or the like, on the machine, having aligned holes therein, or therethrough, to receive the hinge pin.

One or more intermediate support members may be provided to receive and support the hinge pin intermediate adjacent portions of the hinge assembly.

The adjustment member may include at least one stud screw-threadably engaged in the base member and operable to engage a fixed portion of the machine, to enable the inclination of the base member to be selectively adjusted so that a flexible drive member, such as a primary belt (or chain), interconnecting a driving pulley (or sprocket) on the output shaft of the motor and a complementary driven pulley (or sprocket) on an input shaft of the machine to be selectively tensioned (or de-tensioned) when one motor is to be interchanged for another.

In a second aspect, the present invention resides in a machine, such as a portable concrete molding machine, incorporating the mounting assembly as hereinbefore described, and having at least one motor mounted on a respective base member.

BRIEF DESCRIPTION OF THE DRAWINGS

To enable the invention to be fully understood, preferred embodiments will now be described, with reference to the accompanying drawings, in which.

DETAILED DESCRIPTION OF THE PREFERRED EMBODIMENTS

Figure 1:
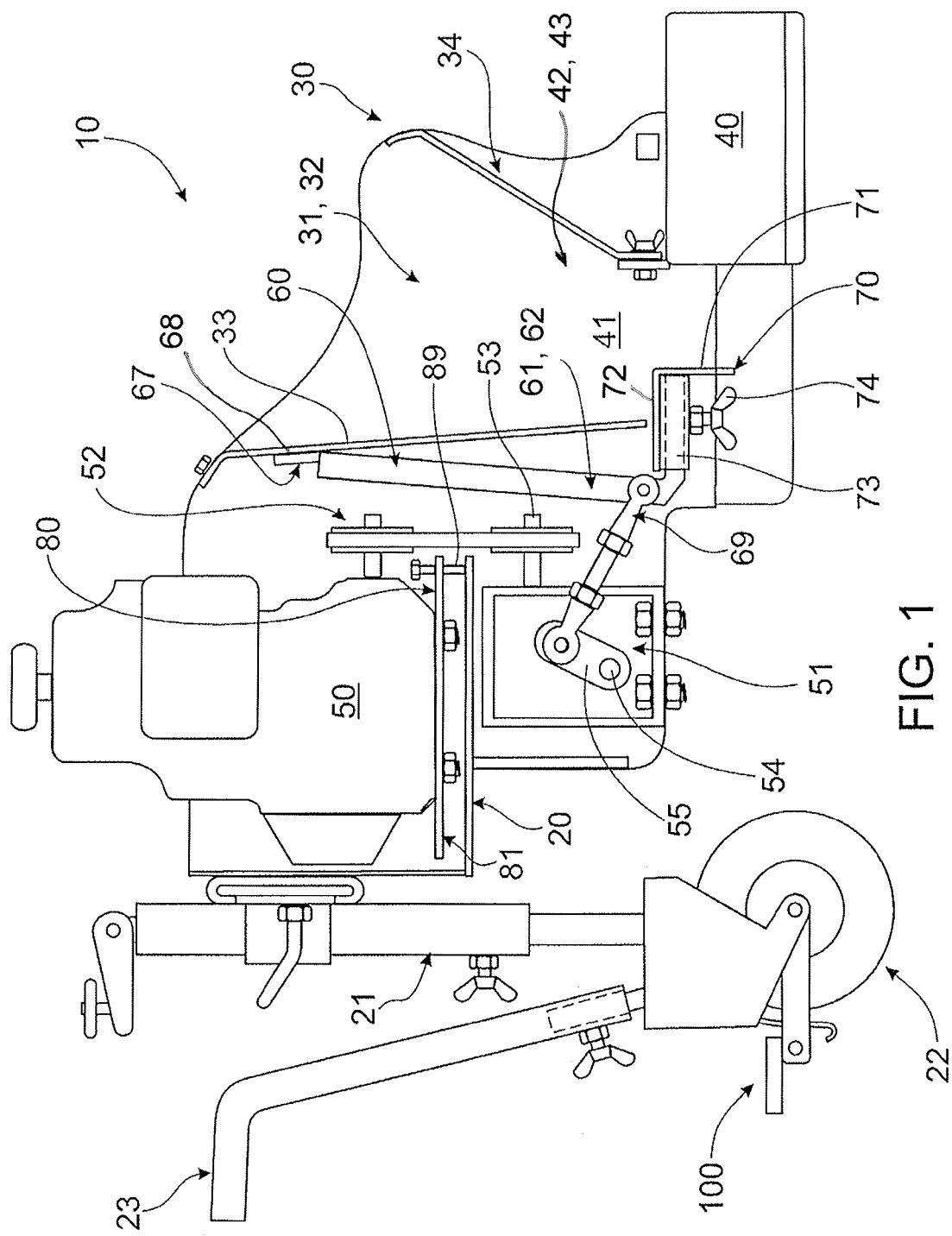
FIG. 1 is a schematic "sectional" side view of a portable concrete molding machine, provided with an internal combustion engine supported on the mounting assembly of the present invention.
Figure 2:
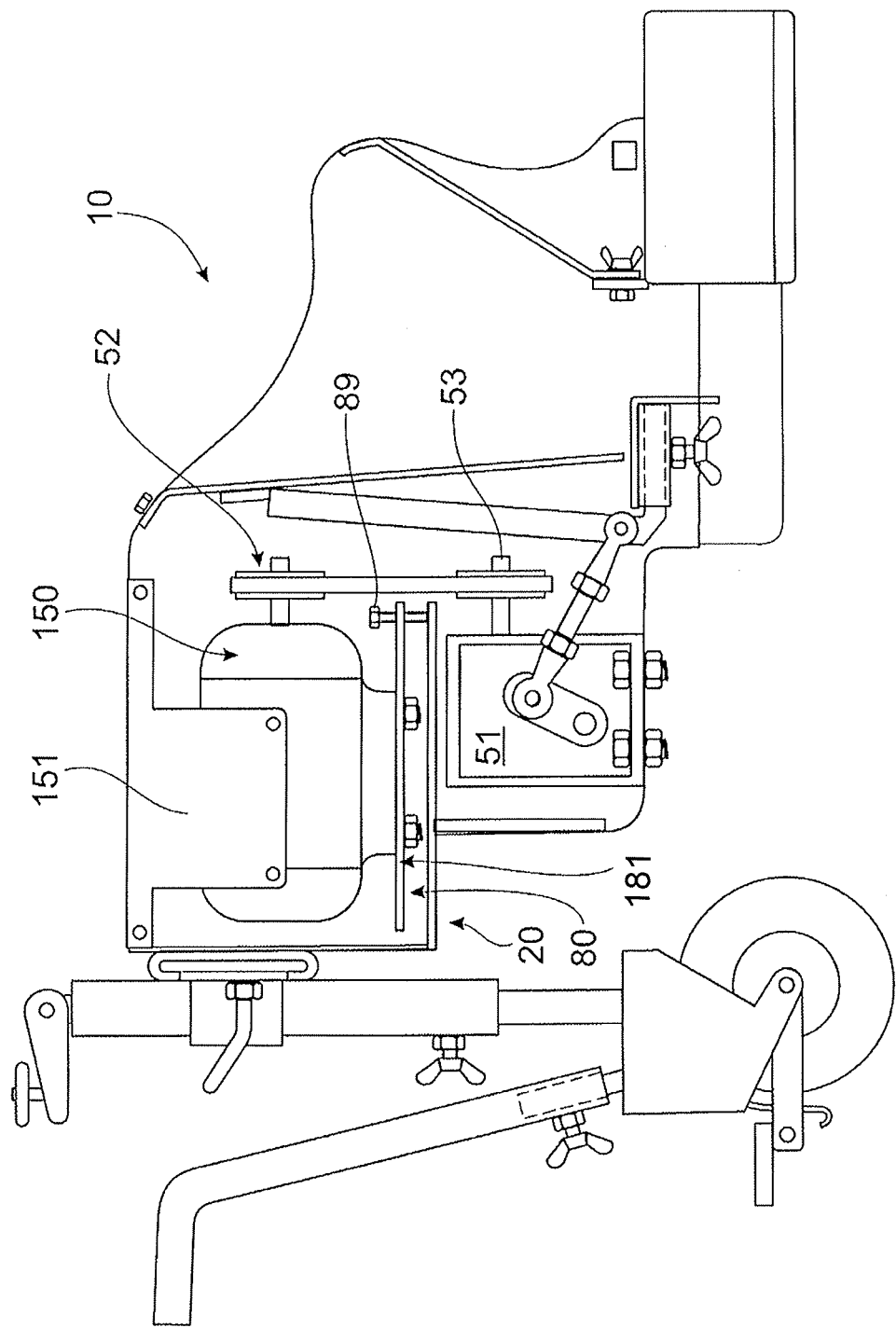
FIG. 2 is a similar view of the machine, with an electric motor mounted on the mounting assembly.

The portable concrete molding machine illustrated in FIGS. 1 and 2 is of the type illustrated in AU 2007100368, the disclosure of which is incorporated in the present specification by reference.

The machine 10 has a main frame 20 supported by a pair of independently height adjustable jockey wheels 22, having respective hand-adjustable mechanical jacks 21, mounted on the main frame, the wheels 22 being interconnected to a steering tiller 23 by a steering linkage not shown.

A hopper 30 has side plates 31, 32 connected to the main frame 20, the hopper 30 further including inclined front and rear walls 33, 34, where the outlet of the hopper is provided above the mouth 41 of the mold 40. The lower ends of the hopper side walls 31, 32 form side walls 42, 43 for the mold 40.

An internal combustion engine 50 is mounted on the main frame 20, via the mounting assembly 80 of the present invention to be hereinafter described in more detail with reference to FIGS. 3 and 4, and is operably connected to a gearbox 51 by a belt-and-pulley driving assembly 52 which drives the input shaft 53 of the gearbox 51.

The gearbox 51 has a pair of diametrically opposed output shafts 54, each output shaft 54 being provided with a crank arm 55.

The upper ends of the pendulum arms 61, 62 are interconnected by one leaf of a hinge assembly 67, which has the second leaf 68 welded or otherwise fixed to the front wall 33 of the hopper 30.

The pusher plate 70 has a pusher face 71 which extends substantially the full width of the mold 40 and has an integral top plate 72, which, as the pusher plate 70 is moved with a reciprocating motion, selectively opens and at least partially closes the mouth 41 of the mold 40 to control the flow of concrete from the hopper 30 to the mold 40.

A pair of adjustable links 69 interconnect the respective crank arms 55 to the pendulum arms 61, 62, the links 69 being adjustable to (a) ensure the reciprocating movement of both pendulum arms 61, 62 is identical and (b) adjust the relative position of the pusher plate 70 to the mouth 41 of the mold to control the volume of concrete passing through the mouth 41 on each reciprocating stroke of the pusher plate 70.

By interconnecting both pendulum arms 61, 62 to respective crank arms 55 driven by the gearbox 51 (via the links 69), an even driving force is applied to the pusher plate 70 as it undergoes its reciprocal movement.

Referring to FIG. 2, the machine 10 is shown with the internal combustion engine 50 of FIG. 1 substituted by an electric motor 150 mounted on a second base plate 181 of the mounting assembly 80. A detachable cover 151 extends over the electric motor 150 to prevent access when the electric motor 150 is connected to an electricity supply (not shown), and a power switch and power socket (both not shown) are provided on the cover 151, or on the motor compartment, to enable connection/control of the electric supply to the electric motor 150.

Figure 3:
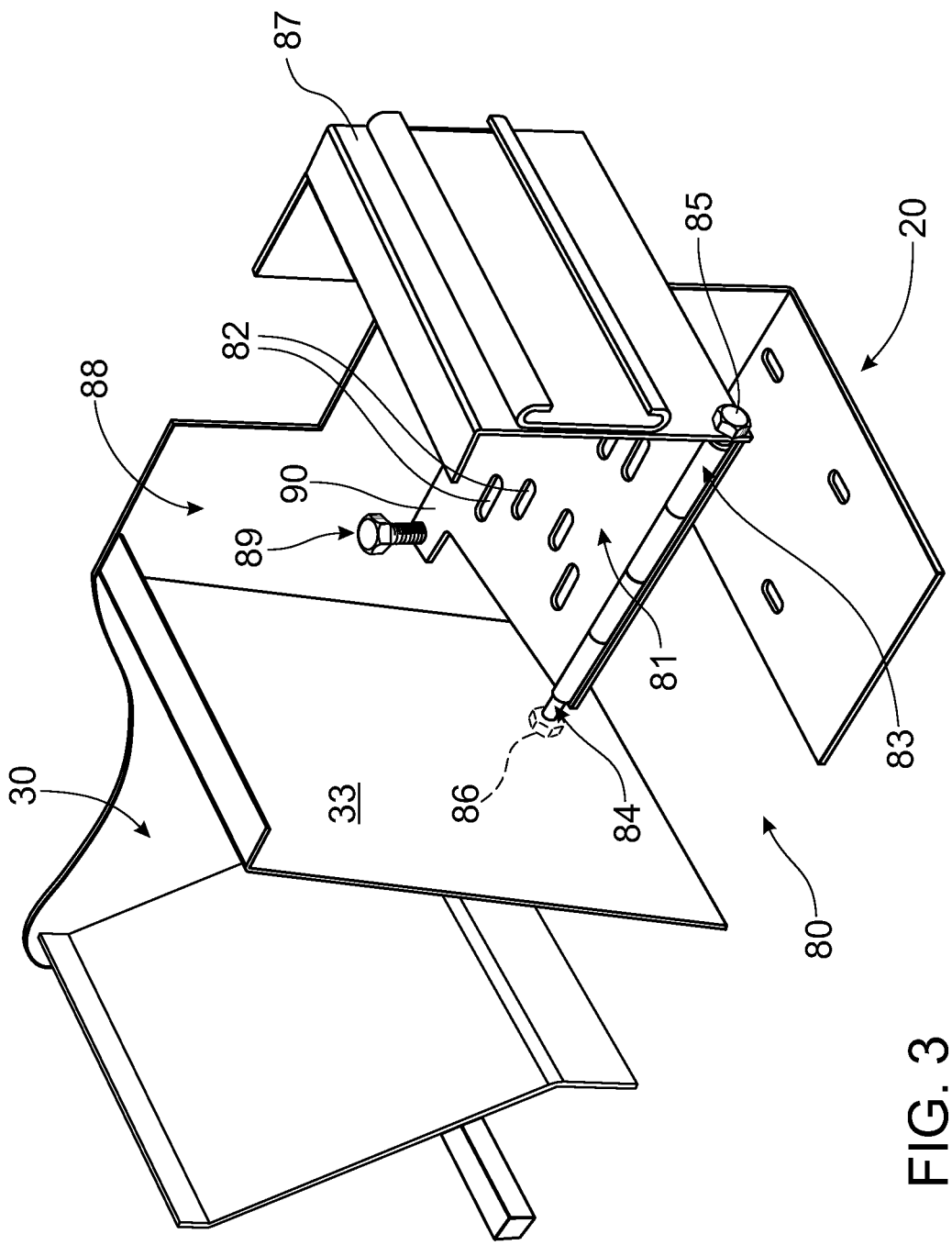
FIG. 3 is a schematic perspective view of the mounting assembly within the motor compartment of the machine.
Figure 4:
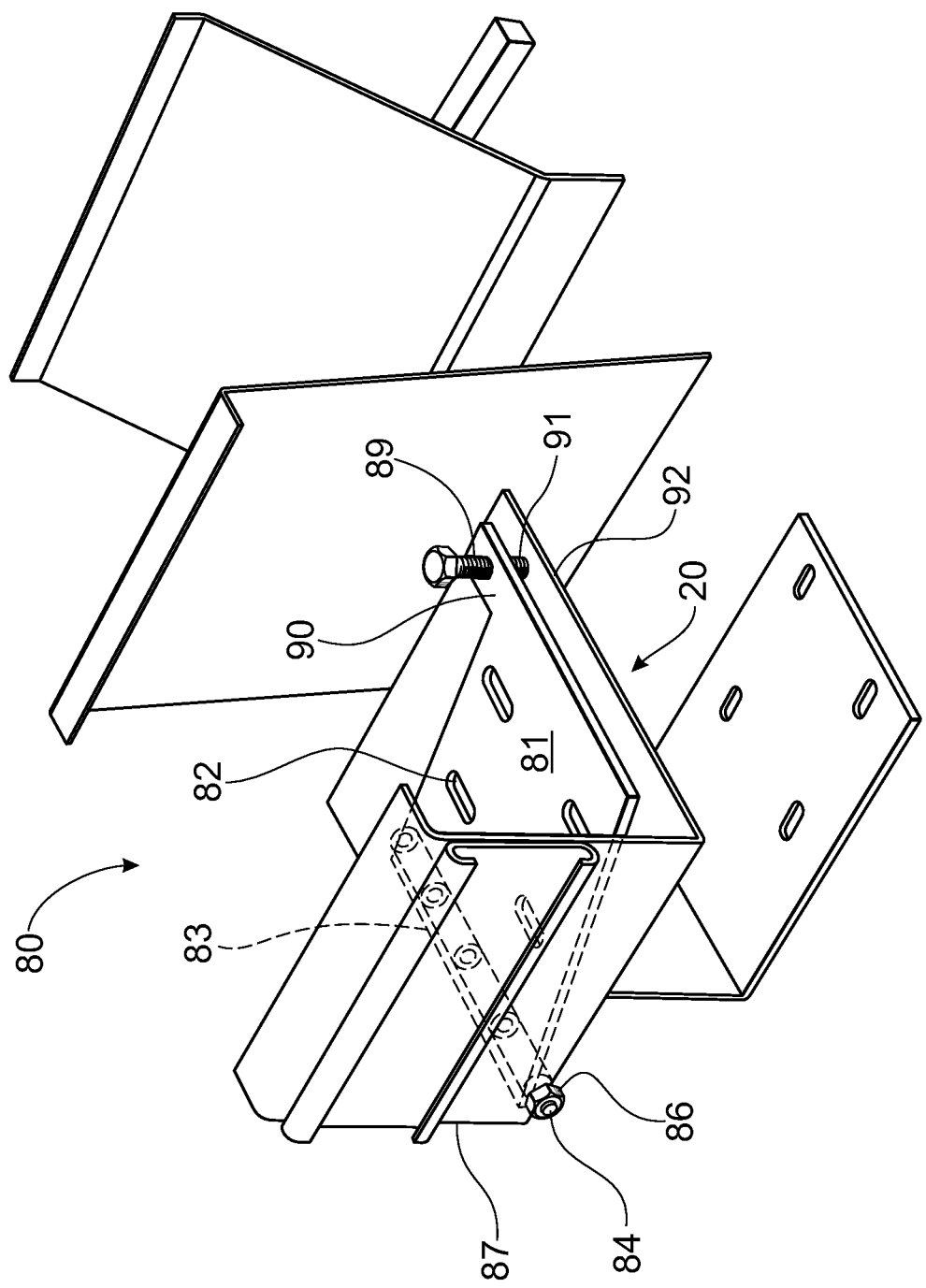
FIG. 4 is a similar view from the opposite side.

Referring now to FIGS. 3 and 4, the mounting assembly 80 has a base plate 81 which is provided with a pattern of holes and/or slots 82 therethrough to enable all the different engines/motors 50, 150, suitable for use with the machine 10, to be mounted thereon.

The base plate 81 may have reinforcing ribs, flanges or formations on the underside (not shown) to increase its mechanical strength.

A hinge assembly 83 is provided along one side of the base plate 81 and is adapted to receive a hinge pin 84, with a head 85 and a removable locking bolt 86 at opposed ends, the hinge pin 84 extending through aligned holes in rear wall 33 of the hopper 30 and the wall 87 which defines the engine compartment 88. (Alternatively, the distal end of the hinge pin 84 is received in a hole in a wall not shown) located adjacent the rear wall 33 which defines the engine compartment 88.) Thus, the wall 87 and the rear wall 33 (or the not shown wall located adjacent the rear wall 33) are a pair of spaced plates acting as support members which are aligned parallel to opposed ends of the base plate 81. Alternatively, the support members may be lugs or the like on the machine not shown) having aligned holes therein to receive the hinge pin 84. In addition, as shown in FIG. 4, the main frame portion 20 may include hinge pin lugs as intermediate support members forming a portion of the hinge assembly 83. The base plate 81 includes adjacent lugs such that the hinge pin 84 is inserted through the lugs of the main frame and the base plate to connect the base plate to the main frame 20. Thus, the lugs are intermediate support members provided to receive and support the hinge pin 84.

An adjusting stud 89 is screw-threadably engaged in, and extends through, the base plate 81 on a lug 90 adjacent the side of the base plate 81 opposite the hinge assembly 83, where the lower end 91 of the adjusting stud 89 engages a fixed portion 92 of the main frame 20.

With reference to FIGS. 1 and 2, it will be apparent to the skilled addressee that the adjusting stud 89 may be rotated to increase the inclination of the base plate 81 relative to the main frame 20, to tension the belt of the driving assembly 52 to enable the internal combustion engine 50, or electric motor 150, to operably drive the gearbox 51.

Conversely, the adjusting stud 89 may be rotated in the opposite direction, to reduce the angle of inclination of the base plate 81, to de-tension the belt of the driving assembly 52, and thereby enable the belt to be removed when either the internal combustion engine 50 or electric motor 150 are to be interchanged.

To enable the internal combustion engine 50 and the electric motor 150 to be rapidly interchanged, each is mounted on a respective base plate 81/181, where the base plates 81/181 can be quickly released from, or engaged to, the main frame 20 by removal, or insertion, of the hinge pin 84.

The pattern of holes and/or slots 82 also enable any fine adjustment of the position of the internal combustion engine 50 or electric motor 150, relative to the gearbox 51, to ensure the driving assembly 52 is accurately aligned.

It is preferred that only one adjusting stud 89 be provided for each base plate 81/181, preferably located adjacent the driving assembly 52, as experimentation has shown it difficult to evenly adjust a pair of the adjusting studs 89.

Figure 6:
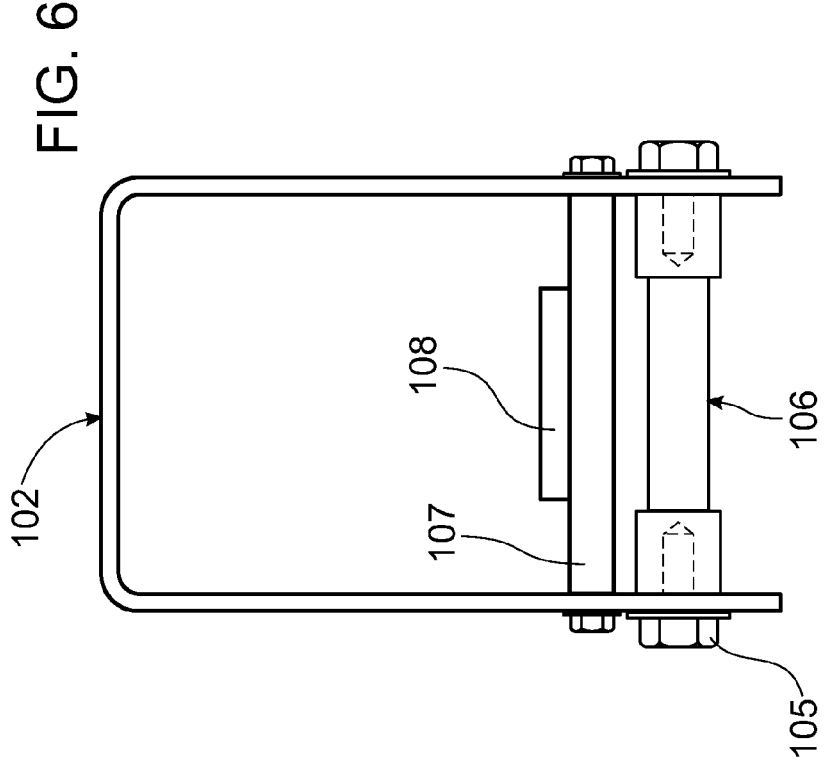
FIG. 6 is a schematic view of the operating mechanism therefor.
Figure 7:
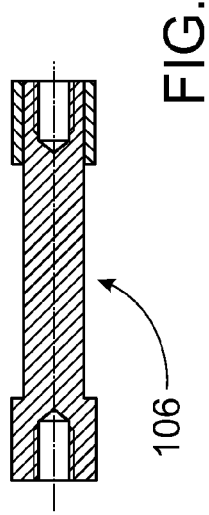
FIG. 7 is a sectional side view of the axle for the jockey wheel.
Figure 5:
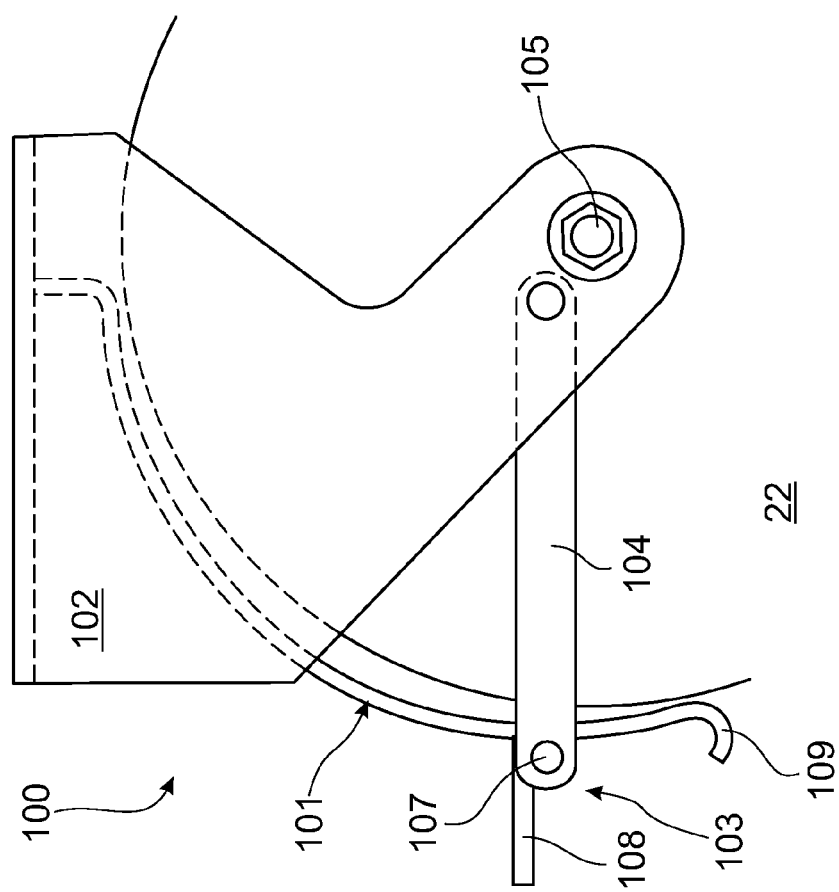
FIG. 5 is a schematic side view of a braking assembly for a jockey wheel of the machine.

Referring to FIGS. 5 to 7, a braking assembly 100 is provided for at least one of the jockey wheels 22, where an arcuate braking plate 101 is anchored to the housing 102 for the jockey wheel 22, and extends around a portion of the jockey wheel 22. A brake actuating member 103, of substantially U-shape—see FIG. 6—has the distal ends of its arms 104 pivotally mounted, via studs 105, received in respective ends of the jockey wheel axle 106. An operating bar 107 interconnects the arms 104 of the brake actuating member 103 and engages the outer (convex) face of the braking plate 101. When an operator presses down on the cross-bar 108 joining the arms 104 of the brake actuating member 103, the operating bar 107 causes the braking plate 101 to swing inwardly into frictional, braking, engagement with the periphery of the jockey wheel 22. (A hook-like formation 109 on the distal end of the braking plate 101 limits the movement of the operating bar 107.)

It will be readily apparent to the skilled addressee that the mounting assembly 80 of the present invention provides a simple, relatively inexpensive, yet efficient, method and apparatus for interchangeably mounting a number of different engines 50 and/or motors 150 in a machine, such as the portable concrete molding machine 10. In addition, the pattern of holes and/or slots 82 in the base plates 81 enable engines 50 or motors 150 of different sizes and/or manufacturers, to be installed in a particular machine 10; and also enables the output shafts of the engines 50 or motors 150 to be aligned with the input shaft 53 of the gearbox 51 so that effective drive is provided by the drive assembly 52 (or an alternative, such as a chain-and-sprockets drive assembly.)

Various changes and modifications may be made to the embodiments described and illustrated without departing from the present invention.

The invention claimed is:

1. A machine comprising:
   one or more support members;
   a mounting assembly coupled to the one or more support members, the mounting assembly for mounting a plurality of different types of motors to the machine, the mounting assembly comprising:
   a substantially planar base plate, having a plurality of slotted holes therethrough, the slotted holes being arranged in a pattern for mounting a first motor of the plurality of different motors to the base plate, and for also mounting a second motor different from the first motor of the plurality of different motors to the base plate;
   a hinge assembly extending along a first side of the base plate;
   at least one hinge pin releasably and hingedly coupling the hinge assembly and the base plate with at least one of the one or more support members of the machine; and
   at least one adjustment member at, or adjacent, a second side of the base plate opposite the first side and operable to pivotally adjust an angular position of the base plate about the hinge pin relative to the one or more support members.

2. The machine as claimed in claim 1, wherein the base plate is provided with reinforcing ribs or flanges on an underside thereof.

3. The machine as claimed in claim 1, wherein the one or more support members on the machine comprises a spaced pair of support members among the one or more support members on the machine, where the spaced pair of support members comprises a pair of spaced plates which define respective ends of a motor compartment on the machine and which are aligned parallel to opposed ends of the base plate.

4. The machine as claimed in claim 1, wherein the hinge assembly comprises one or more intermediate support members provided on at least one of the one or more support members to receive and support the hinge pin and intermediate adjacent portions of the base plate.

5. The machine as claimed in claim 1, wherein the adjustment member includes at least one stud screw threadably engaged in the base plate and operable to engage a fixed portion of the machine, to enable an inclination of the base plate to be selectively adjusted so that a flexible drive member, interconnecting a driving mechanism on an output shaft of the motor and a complementary driven mechanism on an input shaft of the machine to be selectively tensioned or de-tensioned.

6. The machine as claimed in claim 1, further comprising one of the first or second motors fixedly mounted on the base plate of the mounting assembly.

7. The machine as claimed in claim 6, wherein the machine comprises a portable concrete molding machine constructed to be powered by the first motor or the second motor.

8. The machine as claimed in claim 1, wherein the one or more support members comprises a spaced pair of support members among the one or more support members, the spaced pair of support members including lugs on the machine, having aligned holes therein, or therethrough, to receive the hinge pin.

9. The machine as claimed in claim 8, wherein the hinge assembly comprises one or more intermediate support members provided on at least one of the one or more support members to receive and support the hinge pin and intermediate adjacent portions of the base plate.

10. The machine as claimed in claim 6, wherein the at least one hinge pin comprises a single hinge pin releasably received in the hinge assembly.

11. The machine as claimed in claim 10, wherein the one or more support members comprises a spaced pair of the support members among the one or more support members on the machine, where the spaced pair of support members comprises a pair of spaced plates which define respective ends of a motor compartment on the machine and which are aligned parallel to opposed ends of the base plate.

12. The machine as claimed in claim 11, wherein the hinge assembly comprises one or more intermediate support members provided on at least one of the one or more support members to receive and support the hinge pin and intermediate adjacent portions of the base plate.

13. The machine as claimed in claim 10, wherein the one or more support members comprise a spaced pair of the support members among the one or more support members, the spaced pair of support members including lugs on the machine, having aligned holes therein, or therethrough, to receive the hinge pin.

14. The machine as claimed in claim 1, wherein the first motor comprises an internal combustion motor and the second motor comprises an electric motor.

15. A concrete molding machine comprised of:
   one or more support members;
   a motor/base member combination selected from among a plurality of different motor/base member combinations, each motor/base member combination comprising a motor and a base plate connected thereto,
   wherein a first motor/base member combination among the plurality of different motor/base member combinations comprises a first motor and a first base plate connected thereto, and wherein a second motor/base member combination among the plurality of different motor/base member combinations comprises a second motor, different from the first motor, and a second base plate connected thereto,
   wherein each of the first and second base plates comprise a substantially planer plate, having a plurality of slotted holes therethrough, the slotted holes being arranged in a pattern for mounting the first motor and the second motor interchangeably, wherein the selected motor/base member combination is coupled to the one or more support members, wherein each of the first and second base plates further comprises a hinge assembly extending along a first side of the base plate, and wherein at least one hinge pin releasably and hingedly couples the hinge assembly of the base plate with the one or more support members of the machine for mounting the selected motor/base member combination to the machine; and wherein each of the first and second base plates further comprises at least one adjustment member at, or adjacent, a second side of the base plate opposite the first side and operable to pivotally adjust an angular position of the base plate about the hinge pin relative to the one or more support members of the machine for the selected motor/base member combination when mounted to the machine.

* * * * *